(12) United States Patent
Manwaring et al.

(10) Patent No.: US 7,621,197 B2
(45) Date of Patent: Nov. 24, 2009

(54) RELEASABLE PUSH/PULL LOCK DEVICE OF AN ADJUSTABLE STEERING COLUMN ASSEMBLY

(75) Inventors: Marvin V. Manwaring, Clio, MI (US); Richard K. Riefe, Saginaw, MI (US); Amelia M. Lask, Bay City, MI (US); Melvin L. Tinnin, Clio, MI (US); Ravi Ravindra, Saginaw, MI (US); Richard P. Nash, Frankenmuth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 255 days.

(21) Appl. No.: 11/726,216

(22) Filed: Mar. 21, 2007

(65) Prior Publication Data

US 2008/0231031 A1 Sep. 25, 2008

(51) Int. Cl.
*B62D 1/16* (2006.01)
(52) U.S. Cl. .......................... 74/492; 280/775
(58) Field of Classification Search ............ 74/492, 74/493; 280/775, 777
See application file for complete search history.

(56) References Cited

U.S. PATENT DOCUMENTS

| | | | |
|---|---|---|---|
| 4,472,982 A | 9/1984 | Nishikawa | |
| 4,793,204 A | 12/1988 | Kubasiak | |
| 5,588,337 A | 12/1996 | Milton | |
| 5,722,299 A * | 3/1998 | Yamamoto et al. | 74/493 |
| 6,237,439 B1 | 5/2001 | Weber et al. | |
| 6,481,310 B2 | 11/2002 | Janeczko et al. | |
| 6,540,429 B2 | 4/2003 | Weisgerber et al. | |
| 6,616,185 B2 | 9/2003 | Manwaring et al. | |
| 6,659,504 B2 | 12/2003 | Manwaring et al. | |
| 6,695,350 B2 | 2/2004 | Uphaus et al. | |
| 6,729,007 B2 | 5/2004 | Weisberger et al. | |
| 6,857,660 B2 | 2/2005 | Manwaring et al. | |
| 6,863,306 B2 | 3/2005 | Bechtel et al. | |
| 7,055,860 B2 * | 6/2006 | Armstrong et al. | 280/775 |
| 7,093,855 B2 * | 8/2006 | Manwaring et al. | 280/775 |
| 7,281,448 B2 * | 10/2007 | Li et al. | 74/493 |
| 7,331,608 B2 * | 2/2008 | Armstrong et al. | 280/775 |

* cited by examiner

*Primary Examiner*—David M Fenstermacher

(57) ABSTRACT

A steering column assembly of a vehicle has a releasable push/pull lock device for selectably locking an adjustable steering housing and co-extending steering shaft to a stationary bracket or chassis. For driver convenience and comfort, the steering housing and shaft are together adjustable with respect to the bracket. The lock device has a toggle apparatus having a push/pull lever that may extend substantially parallel to a rotating axis of the steering shaft and move in a first direction along its length and between locked and unlocked positions. A carrier of the device connects to the toggle apparatus and moves along its length in a second direction that may be perpendicular to the first direction and as the lever moves between the locked and unlocked positions. Preferably, an indexing apparatus is generally carried between the carrier and at least one of the housing and the bracket for selecting adjustment of the steering column assembly when the device is in the unlocked position.

24 Claims, 15 Drawing Sheets

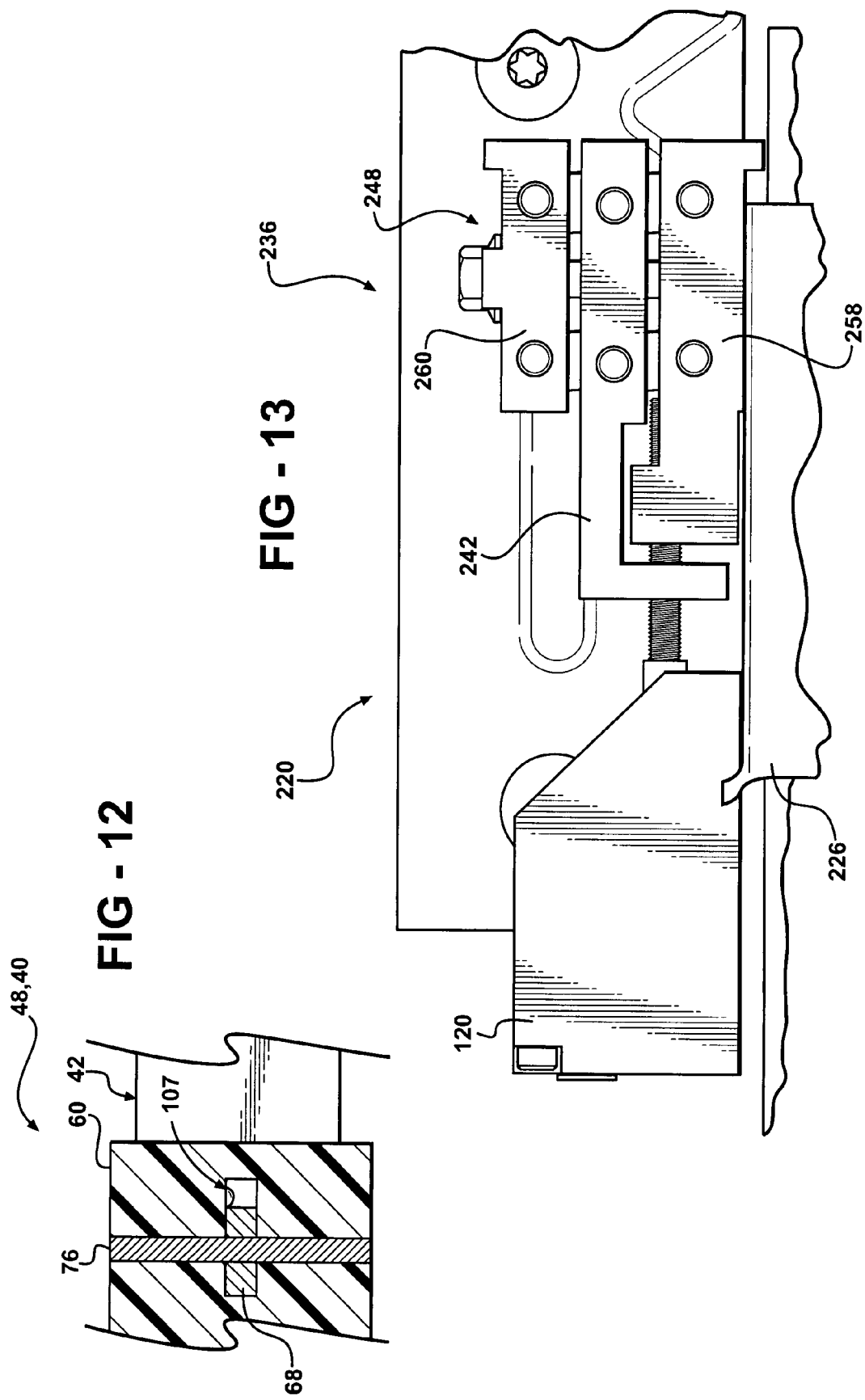

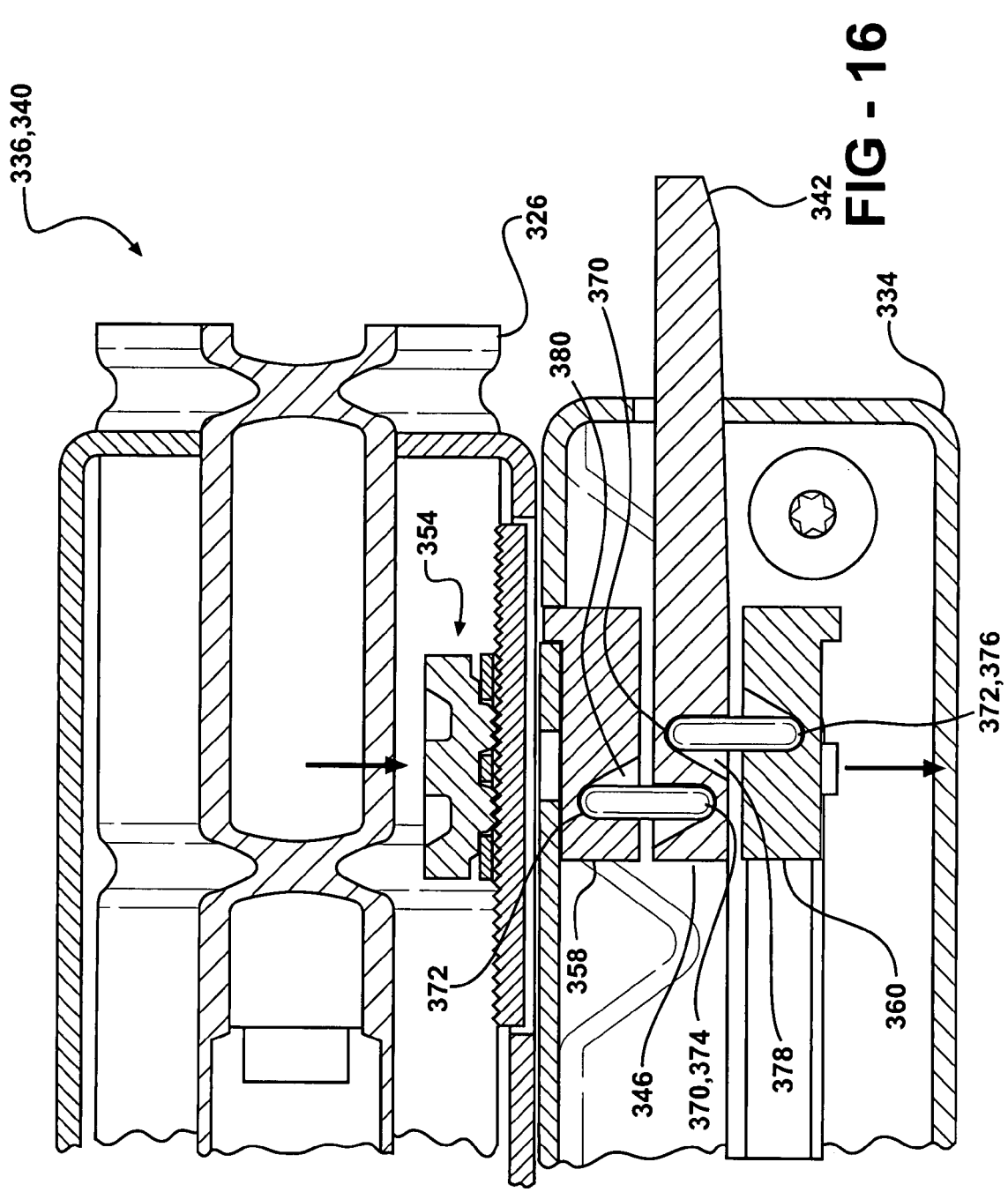

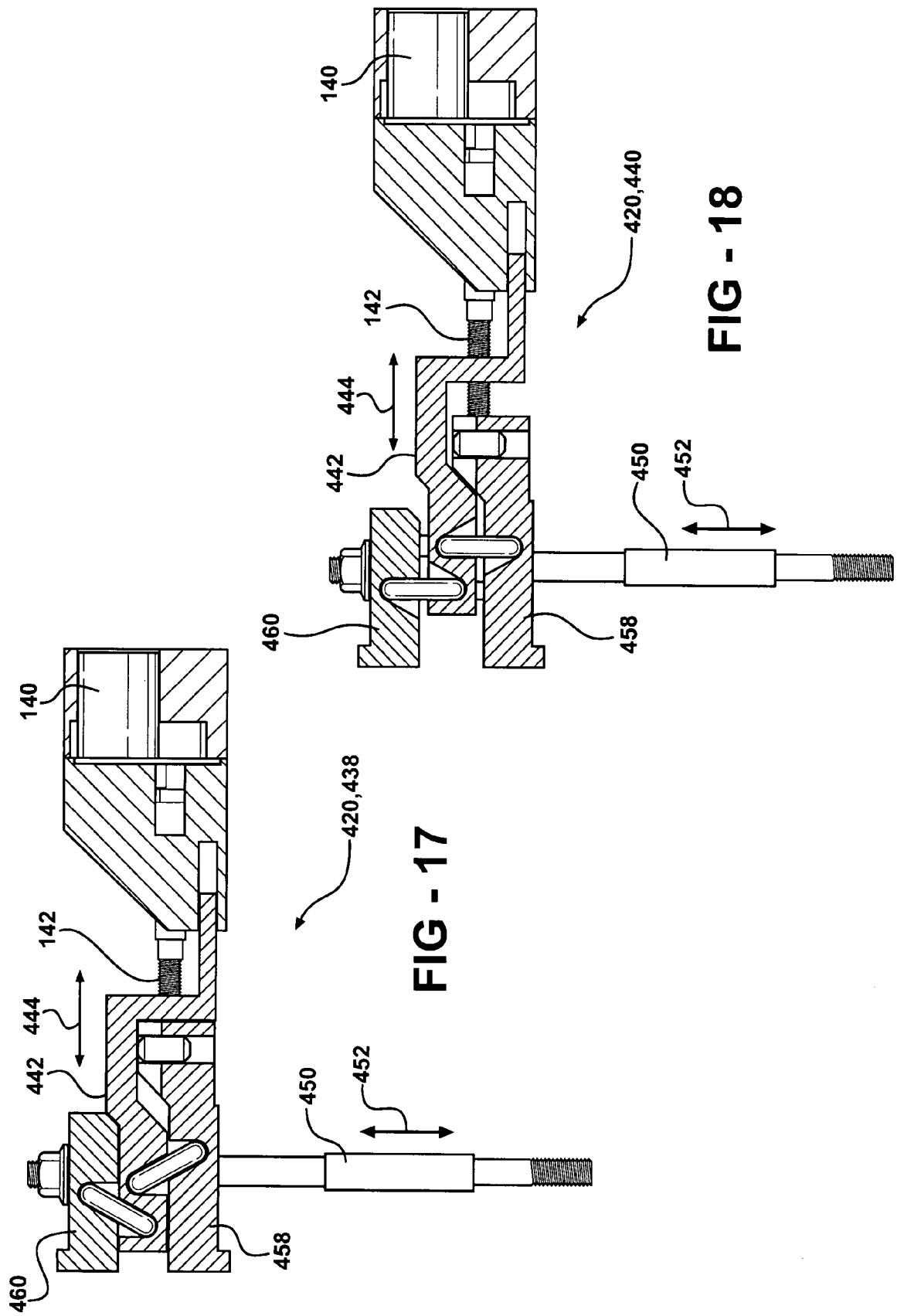

RELEASABLE PUSH/PULL LOCK DEVICE OF AN ADJUSTABLE STEERING COLUMN ASSEMBLY

FIELD OF THE INVENTION

The present invention relates to an adjustable steering column assembly for a vehicle, and more particularly to a central push/pull lock device of the adjustable steering column assembly having a toggle apparatus with a central lever.

BACKGROUND OF THE INVENTION

Known adjustable steering column assemblies can be adjusted in a longitudinal or telescoping direction and in a tilt direction. Generally the longitudinal direction moves a steering wheel forward and rearward with respect to the vehicle and thus farther or closer to the driver. The tilt direction generally moves and tilts the steering in a vertical direction, thus closer or further away from a lap of the driver. To adjust the steering column assembly, the driver must first unlock a lock device before the steering column assembly will move. In some known assemblies, the tilt adjustment and the telescoping adjustment features each have their own lock device. In other known assemblies, a single lock device will release the assembly for both adjustments.

Unfortunately, the actuating levers of known lock devices are typically orientated on either the left or right hand sides of the steering column and actuated via a pivoting movement. This orientation and the required pivoting action limit packaging ability of the assembly and can restrict comfort and convenience for the driver. Moreover, known levers are typically mounted to a stationary bracket of the assembly thus do not move with respect to the steering wheel. Thus and in reference to the steering wheel, the position of the lever changes and may not be ideally positioned through the adjustment range of the assembly.

SUMMARY OF THE INVENTION

A steering column assembly of a vehicle has a releasable push/pull lock device for locking an adjustable steering housing and co-extending steering shaft to a stationary bracket or chassis. For driver convenience and comfort, the steering housing and shaft are together adjustable with respect to the bracket. The lock device has a toggle apparatus having a push/pull lever that may extend substantially parallel to a rotating axis of the steering shaft and move in a second direction along its length and between locked and unlocked positions. As the lever moves between the locked and unlocked positions, a carrier of the device connected to the toggle apparatus moves along its length in a first direction that may be perpendicular to the axis. Preferably, an indexing apparatus is generally carried between the carrier and at least one of the housing and the bracket for selected adjustment of the steering column assembly when the device is in the unlocked position.

Preferably, the lever is disposed between the bracket and a first member of the toggle apparatus. The first member is engaged to the carrier and supported operably by the bracket for movement in the first direction as the lever moves in the second direction. An elongated first linkage of the toggle apparatus extends between the first member and the lever. A first coupling is carried between the first member and a first end of the linkage for pivoting engagement and a second coupling is carried between the lever and an opposite second end of the linkage for pivoting engagement. When the lock device is in the locked position, the linkage extends substantially parallel to the first direction and the lever is laterally spaced from the first member by a distance substantially equal to the throw of the carrier. When the locked device is in the unlocked position, the linkage is angled away from the first direction and the first member is nearer to or is in contact with the lever.

Objects, features and advantages of the present invention include an adjustable steering column assembly having a push/pull lock device that enables a central orientation of a lever of the device. Moreover, because the lever actuates in a direction substantially parallel to the axis of the steering column and the toggle apparatus generally moves with the steering wheel, versatility in the overall packaging of the assembly is improved and operating convenience for the driver is enhanced.

DESCRIPTION OF THE DRAWINGS

These and other objects, features and advantages of this invention will be apparent from the following detailed description, appended claims, and accompanying drawings in which:

FIG. 12 is a partial cross section of the toggle apparatus taken along line 12-12 of FIG. 9;

FIG. 13 is a partial top plan view of a second embodiment of an adjustable steering column assembly;

FIG. 16 is a cross section of the adjustable steering column assembly similar in perspective to FIG. 15 except illustrated in a locked position;

FIG. 17 is a cross section of a fourth embodiment of a push/pull lock device illustrated in an unlocked position; and FIG. 18 is a cross section of the push/pull lock device similar in perspective to FIG. 17 except illustrated in a locked position.

DETAILED DESCRIPTION OF THE PREFERRED EMBODIMENTS

Figure 1:
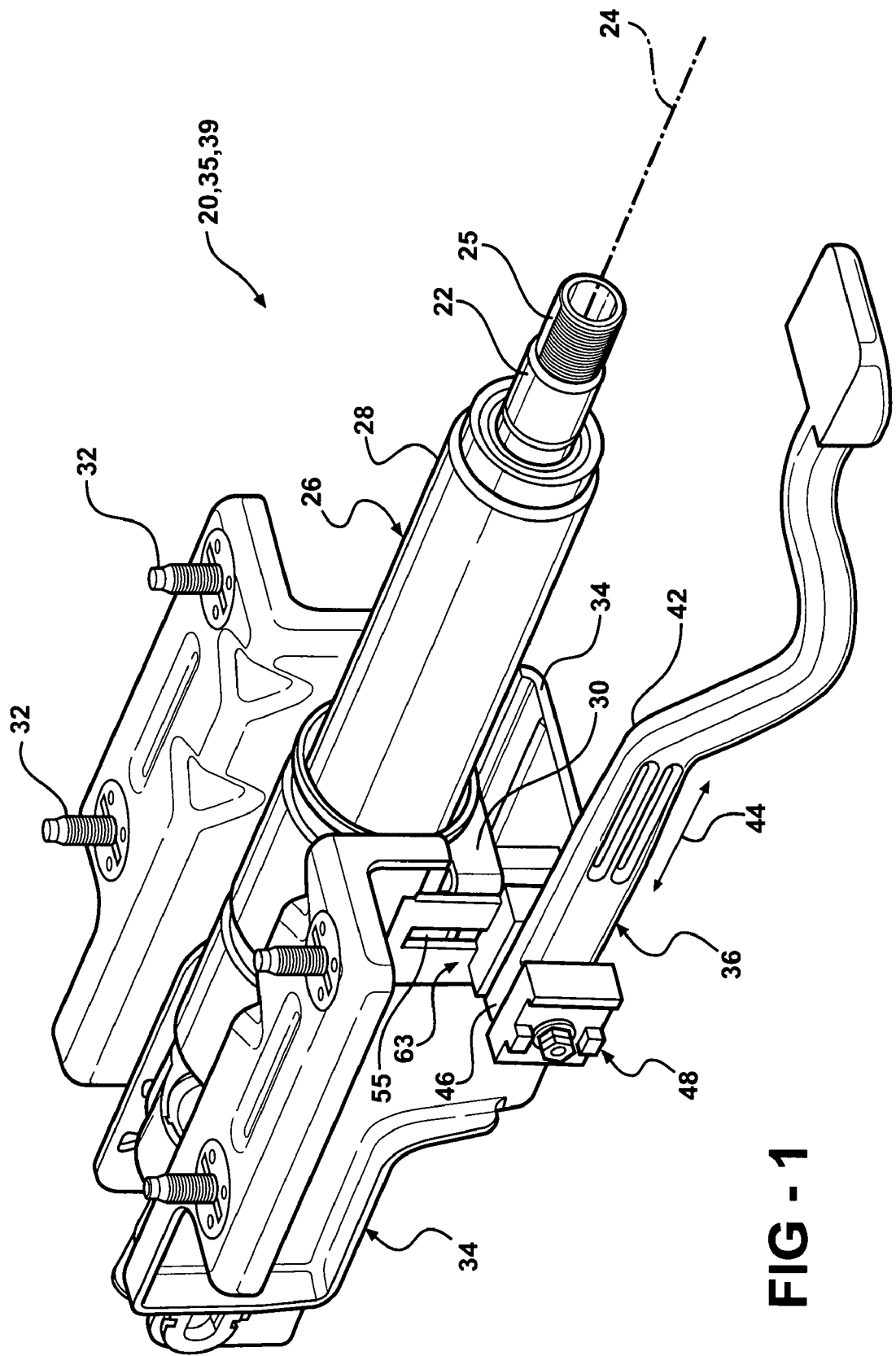
FIG. 1 is a perspective view of an adjustable steering column assembly of the present invention illustrated in a tilt down state and retracted position.

Referring now to FIG. 1 of the drawings, an adjustable steering column assembly 20 for a vehicle has a steering shaft 22 that projects rearward with respect to the vehicle and along a rotation axis 24 to a distal end 25 that attaches to a steering wheel (not shown). The steering shaft 22 is preferably journaled to and rotates within a tilt housing or steering column 26. The housing 26 is supported by a bracket 34 of the assembly 20 that engages rigidly to a chassis of the vehicle via a plurality of pins or threaded studs 32 that project preferably upward from the bracket 34 to engage a chassis. Although not generally illustrated, the pins 32 may be constructed and arranged to shear or break away from the chassis should the driver forcibly impact the steering wheel during a vehicle collision.

Figure 2:
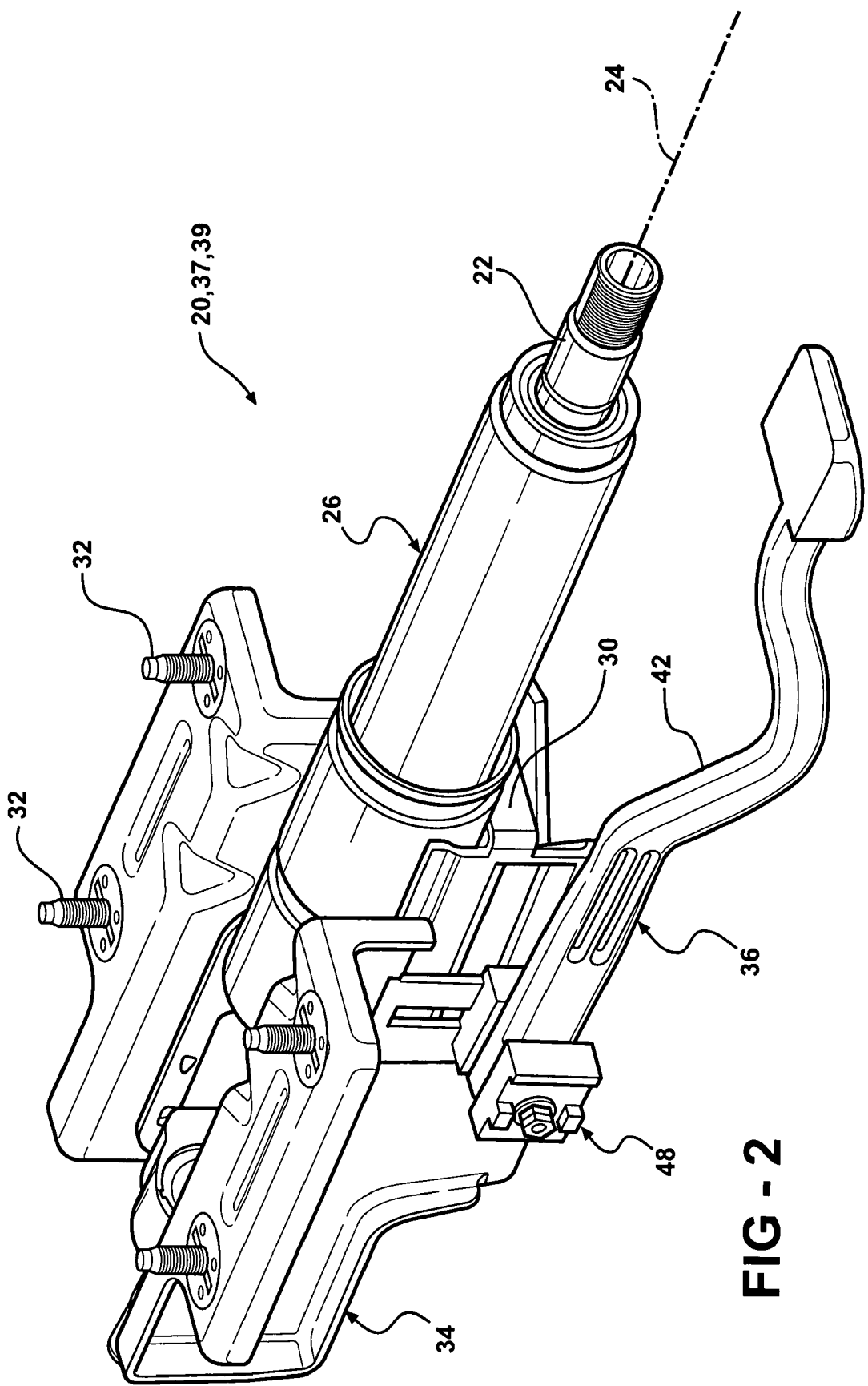
FIG. 2 is a perspective view of the adjustable steering column assembly illustrated in a tilt down state and extended position.

The housing 26 and co-extending shaft 22 are preferably constructed and arranged to extend and retract as a single unit and with respect to the bracket 34 between a retracted position 35 (see FIG. 1) and an extended position 37 (see FIG. 2). When extending, the housing 26 and shaft 22 move in a linear rearward direction with respect to the vehicle, and when retracting, the housing 26 and shaft 22 move in a forward direction and into the bracket 34.

Figure 3:
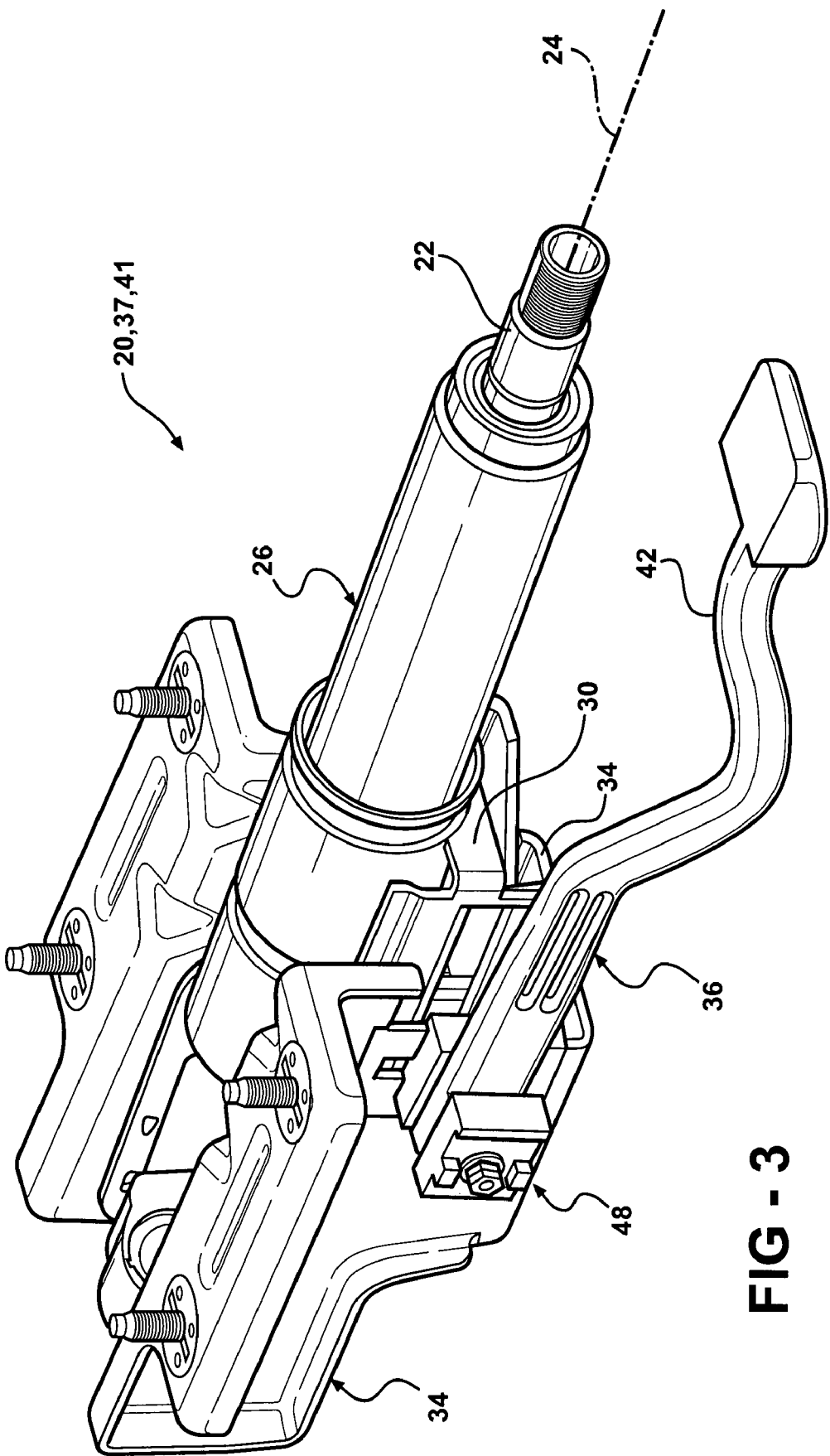
FIG. 3 is a perspective view of the adjustable steering column assembly illustrated in a tilt up state and extended position.

This forward and rearward movement, however, is not necessarily parallel to rotation axis 24 of steering shaft 22 because the housing 26 and shaft 22 are preferably constructed and arranged to tilt as a single unit between a tilt down state 39 (see FIG. 1) and a tilt up state 41 (see FIG. 3). That is, the tilt adjustment adjustably angles shaft 22 and axis 24 with respect to the longitudinal movement in the forward and rearward directions. This tilt adjustment moves the distal end 25 of the steering shaft 22 in an arcuate and substantially vertical direction. To accommodate drivers of small stature, the housing 26 is generally extended near the extended position 37 and tilt down state 39. To accommodate drivers of larger stature, the housing 26 is generally retracted to near the retracted position 35 and the tilt up state 41.

Figure 4:
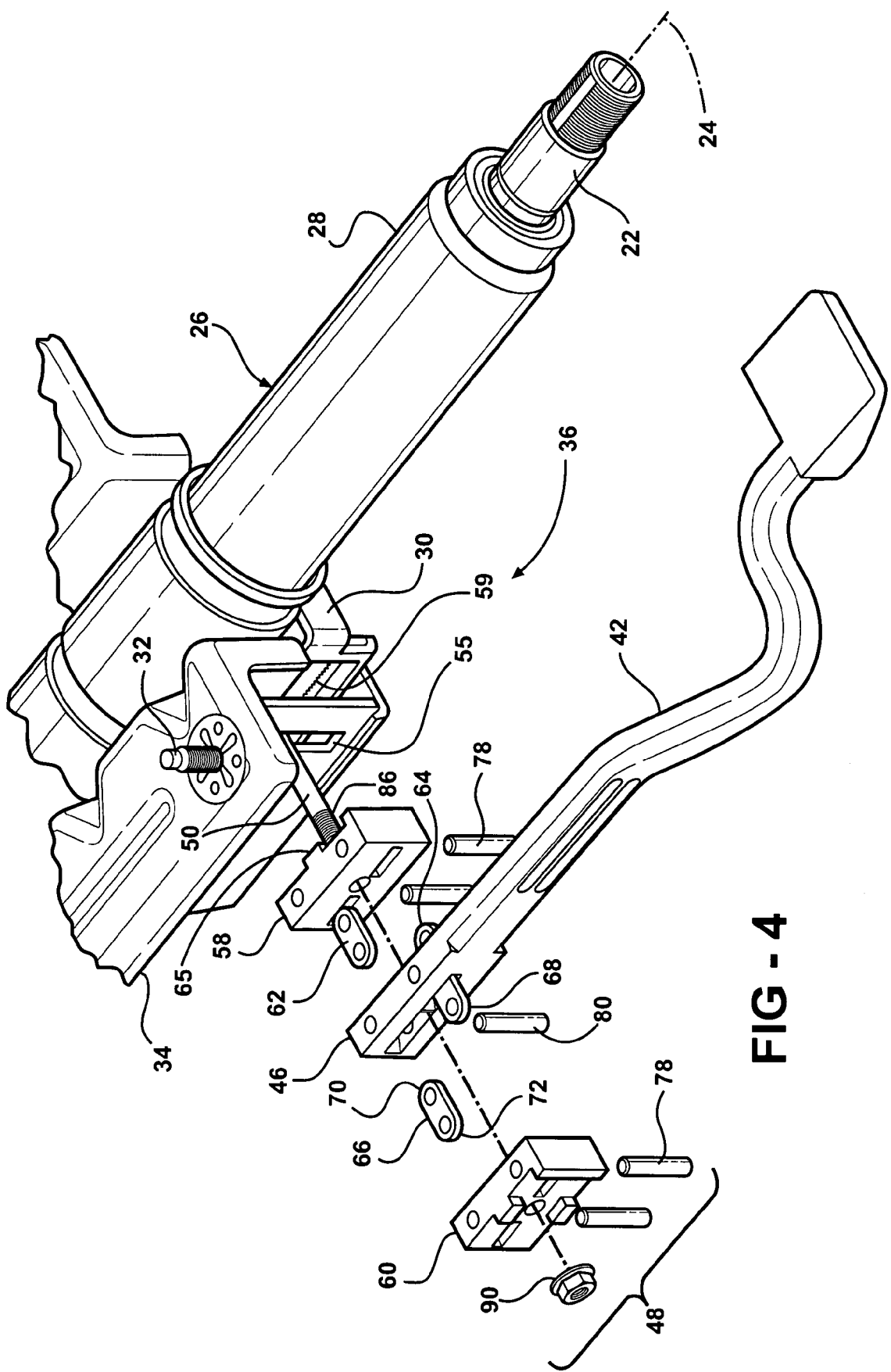
FIG. 4 is an exploded perspective view of the steering column assembly.
Figure 5:
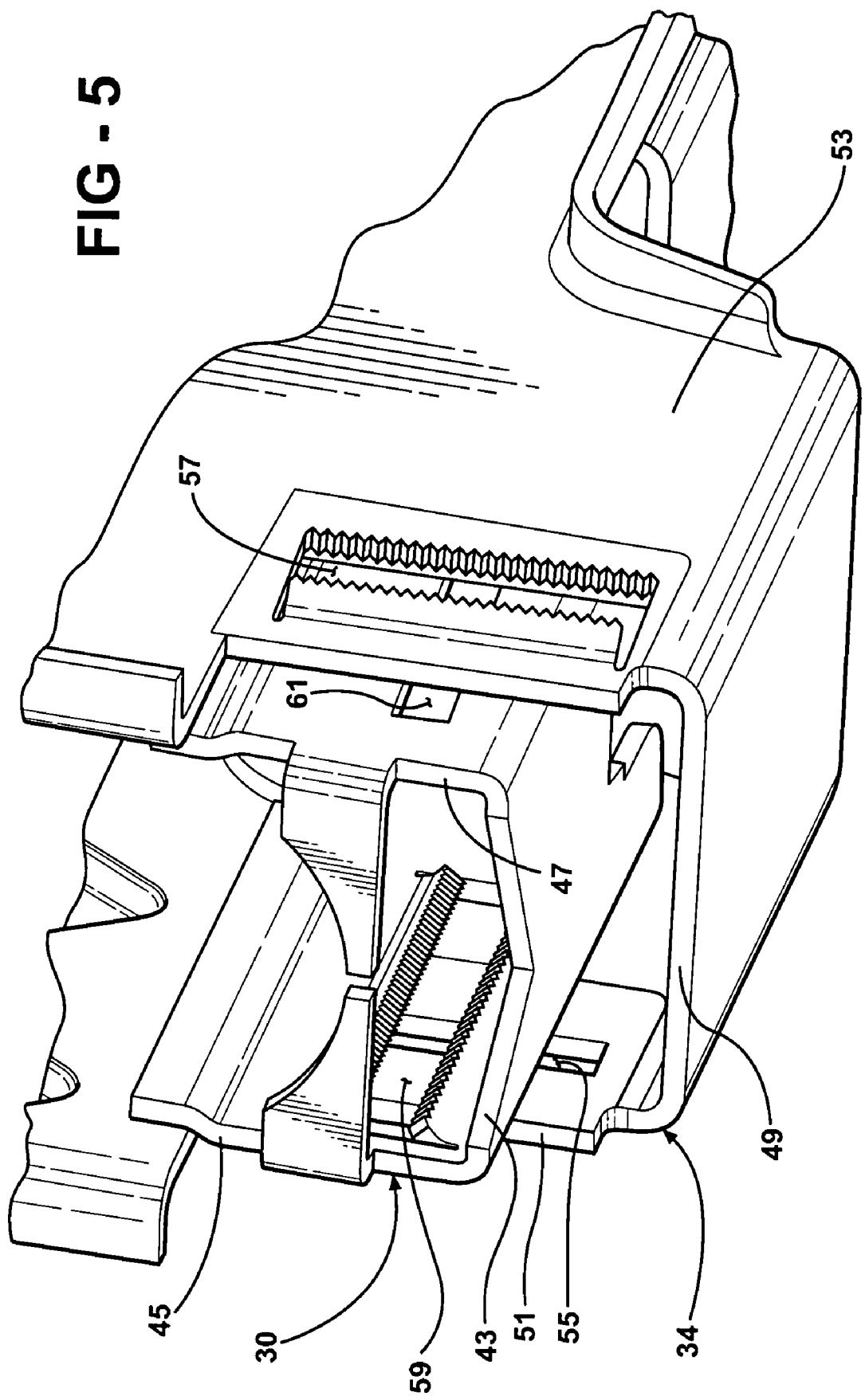
FIG. 5 is a perspective view of a shuttle portion and a bracket of the assembly with other parts removed to show internal detail.

As best illustrated in FIGS. 1 and 4-8, the housing 26 has a substantially tubular portion 28 that surrounds and rotatably supports the rotating steering shaft 22, and a support shuttle portion 30 that projects downward from the tubular portion 28. The shuttle portion 30 is at least in-part located in the bracket 34 and is supported operably by the bracket. The shuttle portion 30 has a cross section that generally forms an upright U-shape having a bottom wall 43 and two opposite side walls 45, 47 that project upward from the bottom wall 43 to rigidly connect to the tubular portion 28. Correspondingly and as best shown in FIG. 5, the bracket 34 has a base 49 located immediately beneath the bottom wall 43 of the shuttle portion 30 and two opposite sides 51, 53 projecting upward from the base 49 to preferably engage the vehicle chassis via the pins 32. With respect to axis 24, the sides 51, 53 are located immediately outward from the respective side walls 45, 47 of the shuttle portion 30.

A substantially vertical first slot 55 is located in the first side 51 of the bracket 34 and a substantially vertical second slot 57 is located in the second side 53 of the bracket 34. Both slots 55, 57 enable tilting movement of the housing 26 between the tilt down and tilt up states 39, 41. Preferably, the first side 51 that defines the first slot 55 is generally smooth and the second side 53 adjacent the second slot 57 is indexed for selection of a tilt position. For telescoping or longitudinal movement of the assembly 20 between the retracted and extended positions 35, 37, a substantially horizontal third slot 59 is in the first side wall 45 and generally crosses or communicates laterally with the first slot 55, and a substantially horizontal fourth slot 61 is in the second side wall 47 and generally crosses or communicates laterally with the second slot 57. Preferably, the second side wall 47 that defines the fourth slot 61 is generally smooth and the first side wall 45 adjacent the third slot 59 is indexed for selection of a longitudinal or extended/retracted position of the assembly 20.

Figure 6:
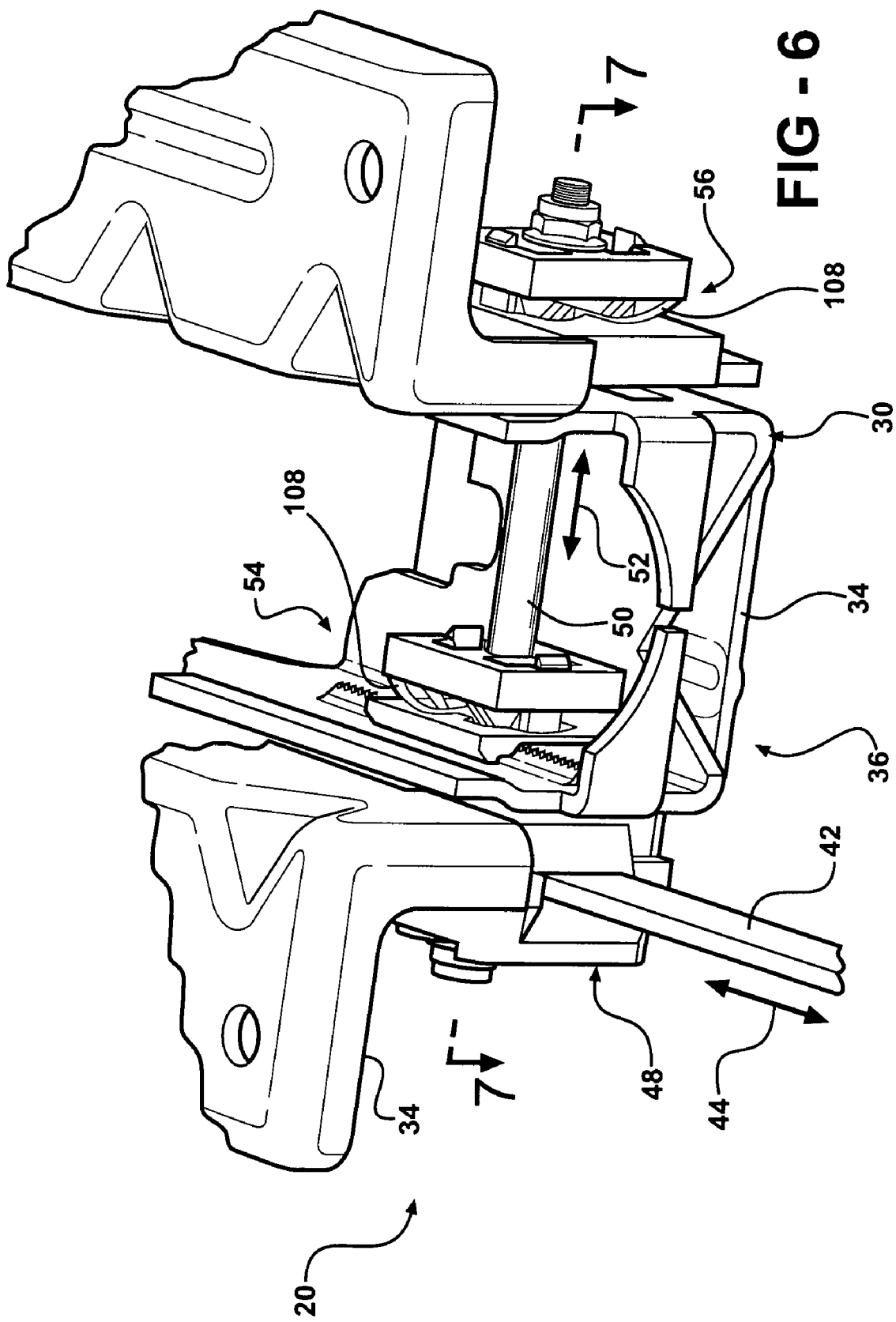
FIG. 6 is a partial perspective view of the steering column assembly illustrating extension and tilt indexing apparatuses of a push/pull lock device of the assembly.

Referring to FIGS. 4-6, the assembly 20 has a central push/pull lock device 36 that has a first indexing apparatus 54 for adjusting and locking the longitudinal extension position of the assembly 20, preferably a second indexing apparatus 56 for adjusting and locking the tilt state of the assembly 20, a toggle apparatus 48, and a linking carrier or rod 50 that operably links both indexing apparatuses 54, 56 to the toggle apparatus 48. The elongated carrier 50 extends through all four slots 55, 59, 61, and 57 and is substantially perpendicular to the axis 24. The toggle apparatus 48 engages the carrier 50 outward from the first side 51 of the bracket 34, engages the indexing apparatus 54 between side walls 45, 47 of the shuttle portion 30, and engages the indexing apparatus 56 outward from the second side 53 of the bracket 34. Each indexing apparatus 54, 56 has a respective leaf spring 108 (see FIG. 6) that preferably biases the lock device 36 toward an unlocked position 38 (see FIG. 8).

Referring to FIGS. 1 and 4 and more specific to the present invention, the toggle apparatus 48 of the lock device 36 has a lever 42 that projects substantially rearward with respect to the vehicle and is orientated substantially parallel to the axis 24. The lever 42 generally moves along its length in opposing directions 44. The toggle apparatus 48 transfers this motion that is substantially parallel to the axis 24 to a motion of opposing directions 52 (See FIG. 6) of the elongated carrier 50 that is substantially perpendicular to axis 24. Opposing directions 52 are substantially perpendicular to directions 44 and to axis 24 regardless of the tilt state. When the assembly moves between the extended and retracted positions 35, 37, the elongated carrier 50 generally remains with the bracket 34 and does not generally move with the shuttle portion 30 of the housing 26. Any such movement of the carrier 50 in a substantially horizontal plane is prevented by the opposing longitudinal edges of the bracket 34 that define the vertical slots 55, 57. However, when the assembly 20 moves between the tilt states 39, 41, the elongated carrier 50 is in motion with respect to the stationary bracket 34 and generally moves with the shuttle 30. Movement of the carrier 50 when adjusting the tilt state is then guided by the substantially vertical slots 55, 57 (See FIG. 5).

Figure 8:
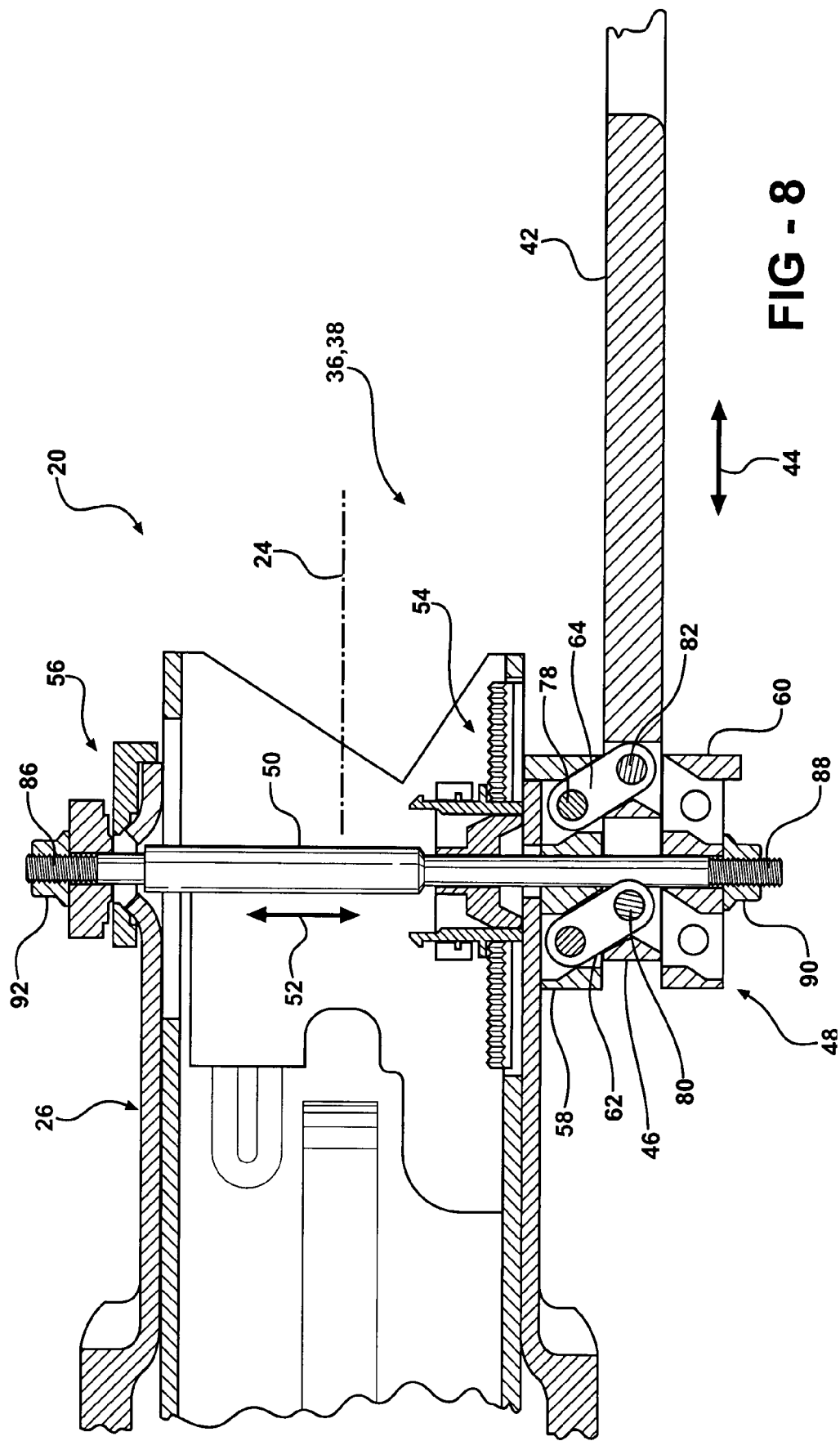
FIG. 8 is a cross section of the steering column assembly similar in perspective to FIG. 7 except illustrated in an unlocked position.
Figure 9:
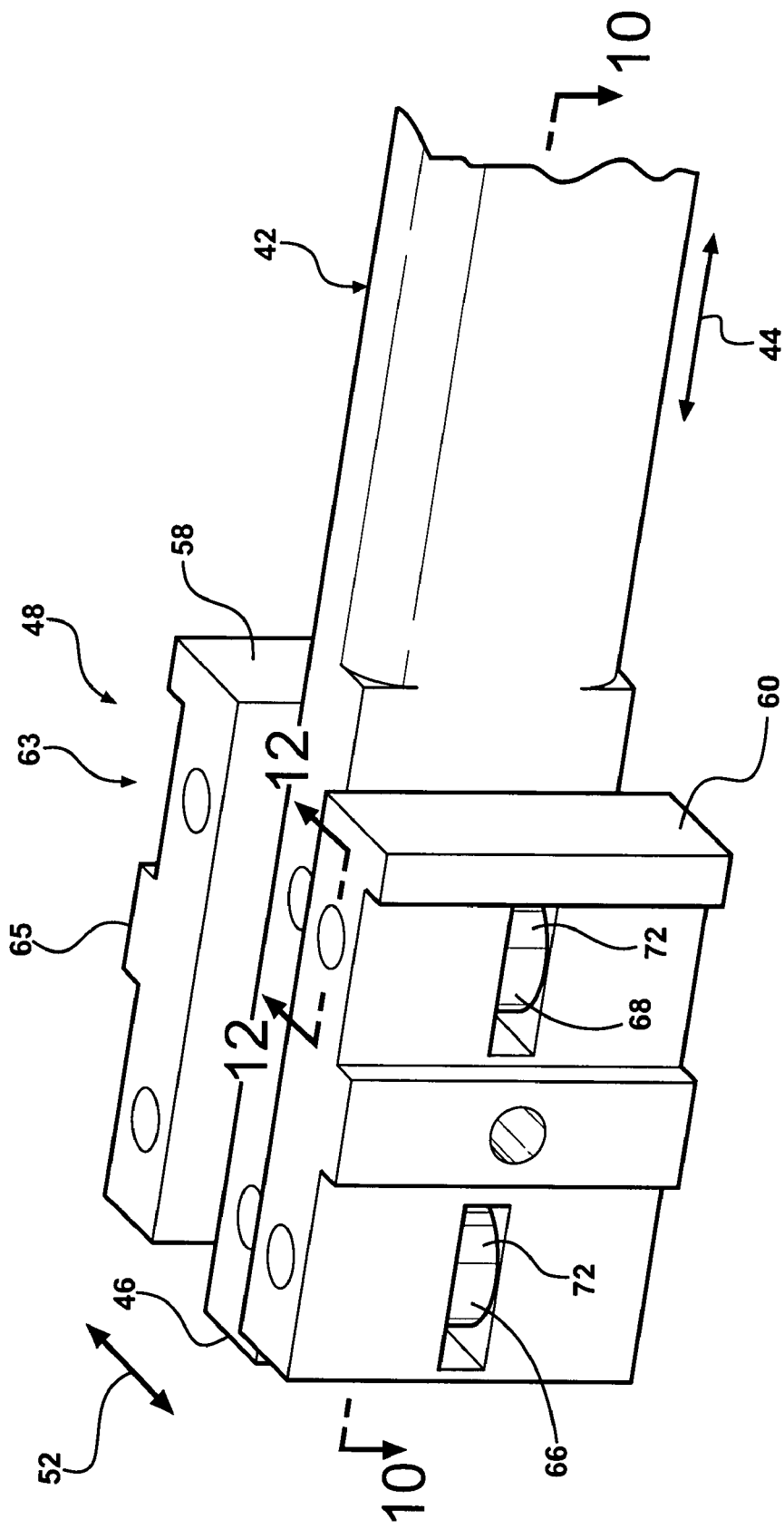
FIG. 9 is a perspective view of a toggle apparatus of the lock device.
Figure 10:
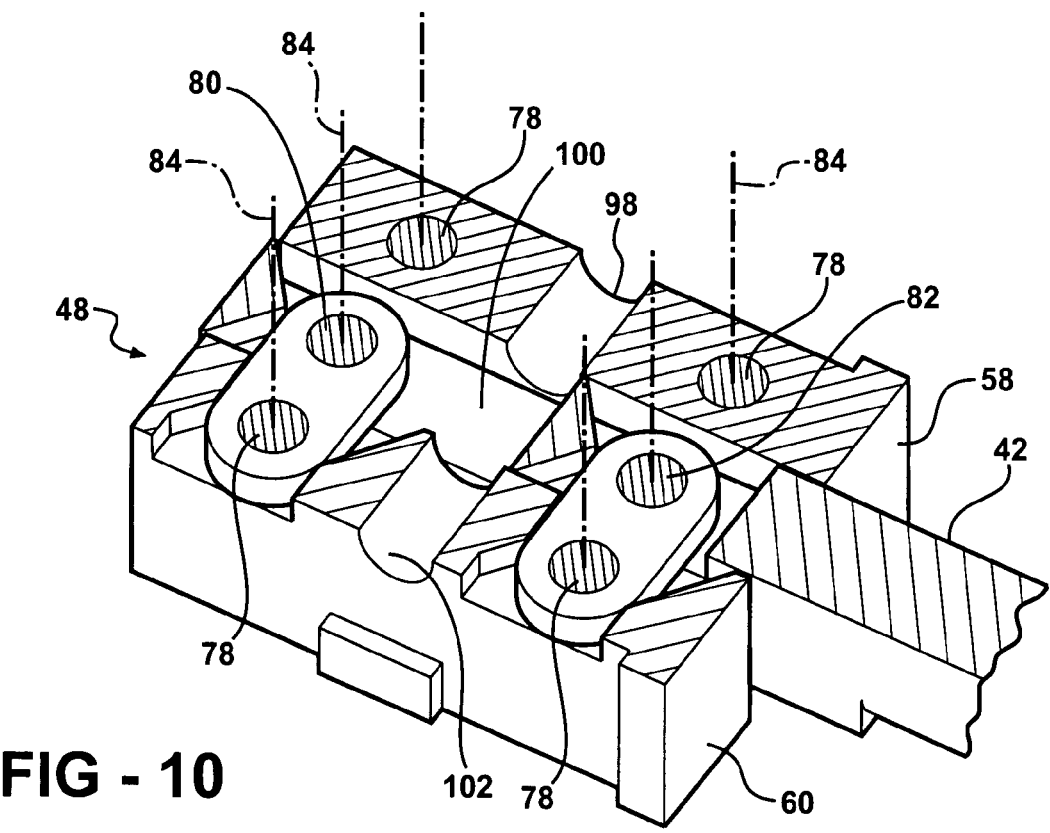
FIG. 10 is a perspective cross section of the toggle apparatus illustrated with the device in the locked position and taken along line 10-10 of FIG. 9.
Figure 11:
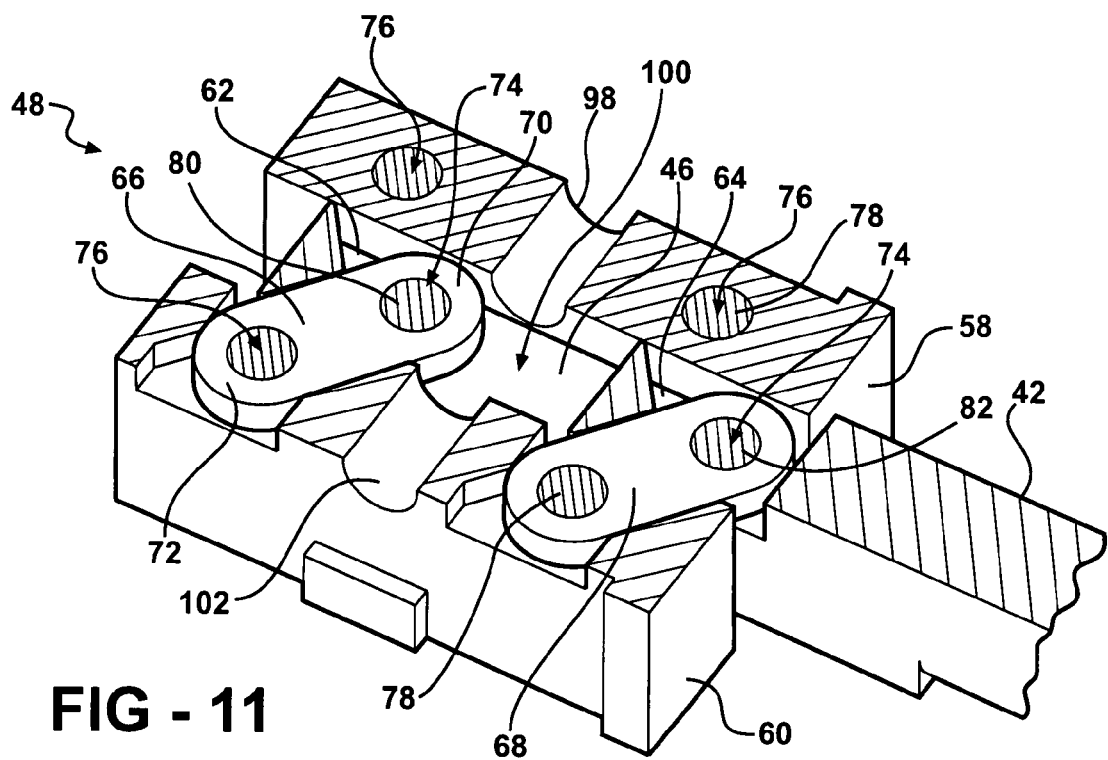
FIG. 11 is a perspective cross section of the toggle apparatus similar in perspective to FIG. 10 except with the device illustrated in the unlocked position.

Referring to FIGS. 9-11, the toggle apparatus 48 of the push/pull lock device 36 has an inner member or block 58 located and preferably supported slidably by the bracket 34. A guide feature 63 (also see FIG. 1) is carried between the bracket 34 and the block 58 for preventing or restricting movement of the block 58 when the assembly 20 is moving between positions 35, 37, and enabling guided vertical movement of the toggle apparatus 48 when the assembly 20 is moving between tilt states 39, 41. Preferably, the guide feature 63 has a projection 65 that projects from the block 58 and into the slot 55 in the bracket 34. A radially outer member or block 60 of the apparatus 48, with respect to axis 24, moves in directions 52 upon movement of lever 42 along directions 44. An end segment 46 of lever 42 is preferably located between the inner and outer blocks 58, 60. Segment 46 operably engages the inner block 58 via a pair of inner linkages 62, 64 (see FIGS. 7 and 8) and operably engages the outer block 60 via a pair of outer linkages 66, 68 (see FIGS. 9-11). The linkages 62, 64, 66, 68 are preferably elongated each having a first end 70 associated with the end segment 46 of the lever 42 and an opposite second end 72 associated with the respective blocks 58, 60. The toggle apparatus 48 further has four lever-side couplings 74 carried generally between the end segment 46 and the first ends 70 of each respective linkage 62, 64, 66, 68, and four block-side couplings 76 carried generally between the second ends 72 of each respective linkage 62, 64, 66, 68 and the respective blocks 58, 60.

Preferably, the couplings 74, 76 are pivoting joints with the four block-side joints 76 each having a respective pin 78 preferably press fitted into the blocks 58, 60 and about which the respective first ends 72 rotate. The four lever-side joints 74 are similar except they preferably share two pins 80, 82 (not four) that are press fitted into the end segment 46 of the lever 42. Linkages 62, 66 rotate about pin 80 and linkages 64, 68 rotate about pin 82. Because of the sharing of pins 80, 82, the linkages 66, 68 are preferably stacked directly above the respective linkages 62, 64. All six pins 78, 80, 82 have respective axes 84 that are substantially parallel to one another, and substantially perpendicular to movement of the lever 42 along opposing directions 44. The linkages 66, 68 both move in a first imaginary plane and the linkages 62, 64 both move in a second imaginary plane that is preferably parallel to the first imaginary plane.

Referring to FIGS. 7-8 and 10-11, the elongated carrier 50 is preferably a rod having opposite threaded ends 86, 88 for threaded engagement to respective lock nuts 90, 92. The rod 50 extends slidably through a bore 98 in the inner block 58, slidably through an oblong bore or through cavity 100 in the end segment 46 of the lever 42, and preferably threads to the outer block 60 within a bore 102 in the outer block 60. The rod 50 is fitted closely to the inner block 58 within the bore 98 to generally function as a bushing interface for sliding movement of the rod 50 in the directions 52 and for preventing unwanted lateral movement of the rod in direction 44. The through cavity 100 communicates through the lever 42 and is elongated in direction 44 by a distance equal to or slightly greater than the distance of the throw of the lever 42 as the lever moves between unlocked and locked positions 38, 40 (see FIGS. 7-8).

Figure 7:
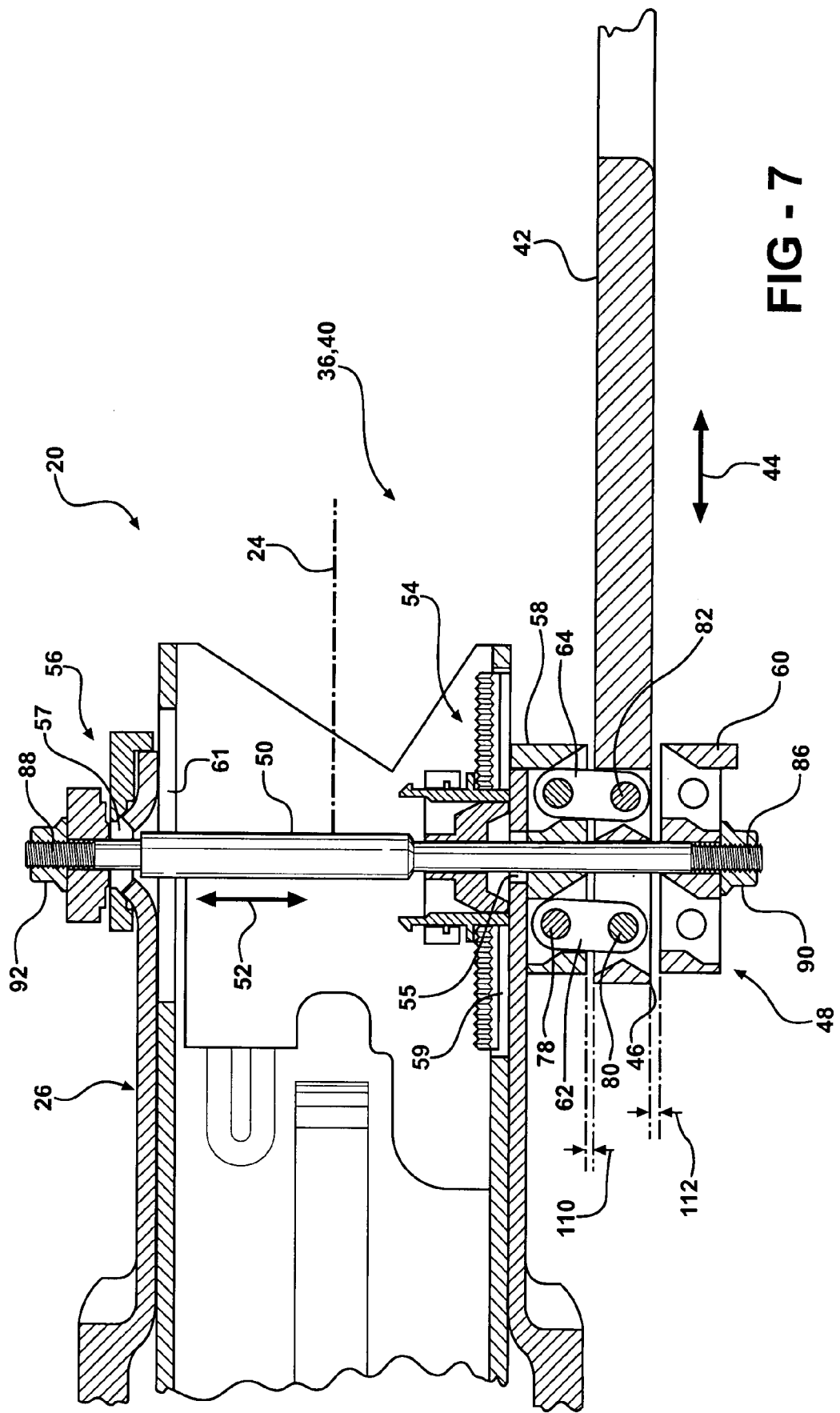
FIG. 7 is a cross section of the steering column assembly illustrated in a locked position and taken along line 7-7 of FIG. 6.

During operation of the lock device 36, the indexing apparatuses 54, 56 are simultaneously placed in the unlocked position 38 (as best shown in FIG. 7) when the driver desires to longitudinally and/or tiltably adjust the steering housing 26. The lock device 36 is placed in the locked position 40 (as best shown in FIG. 6) after the driver has selected a desirable position and state for the steering wheel. In order to move the device 36 between the unlocked and locked positions 38, 40, the driver respectively pulls and preferably pushes upon the lever 42 of the device 36. The lever 42 generally remains substantially parallel to tiltable axis 24 regardless of longitudinal positions 35, 37 and regardless of tilt states 39, 41. Because movement and projection of the lever 42 is substantially parallel to axis 24, the lever 42 is generally central to the assembly 20 as opposed to known levers that project radially with respect to a steering shaft and that generally pivot. As noted above, the actuating levers of known lock devices are typically orientated on either the left or right hand sides of the steering column and actuated via a pivoting movement, which limit packaging ability of the assembly and can restrict comfort and convenience for the driver. The rectilinear motion of lever 42 indicated by opposing directions 44, however, is nonpivoting lever motion.

As previously described, springs 108 of respective indexing apparatuses 54, 56 bias the lock device 36 toward the unlocked position 38. The toggle apparatus 48, however, maintains the lock device 36 in the locked position 40 and against the biasing force of the springs 108 generally through an "over the center relationship" of the linkages 62, 64, 66, 68 with respect to the spring biased movement of the carrier 50 along direction 52 and toward the unlocked position 38. That is, when the indexing apparatuses 54, 56 are unlocked, the linkages 62, 64, 66, 68 are angled with respect to directions 52. Moving the lever 42 toward the locked position 40 begins to align the linkages 62, 64, 66, 68 with directions 52 and against the spring force. The device 36 is generally locked when the linkages 62, 64, 66, 68 are parallel to directions 52, however, a slight continued movement of lever 42 in direction 44 slightly angles the linkages in an opposite direction or slope with respect to direction 52 and the respective linkage angle when moving from the unlocked to the locked position. Thus when unlocking the device 36, a slight spring force must be first overcome as the linkages generally move over the parallel relationship with the direction 52.

Alternatively or in addition to the "over the center relationship" and referring to FIGS. 7 and 12, the toggle apparatus 48 may include a detent feature 107 that generally and resiliently locks the toggle apparatus 48 into the locked position 40. Feature 107 may generally be carried between any two parts of the toggle apparatus 48 that move relative to one another. As an example and as illustrated in FIG. 12, the detent feature 107 may be carried between any one or all of the linkages 62, 64, 66, 68 and any one or both of the blocks 58, 60. The biasing force exerted by the springs 108 of the indexing apparatuses 54, 56 is generally less than the inherent frictional forces and leveraging aspects of the toggle apparatus 48 combined with the force necessary to generally release the detent feature 107. This alternative relationship as does the "over the center relationship", prevents the unintentional moving of the toggle apparatus 48 from the locked position 40 to the unlocked position 38 without an additional force intentionally exerted by the driver. Moreover, one skilled in the art would now realize that the detent feature 107 could also be carried between any one or both of the blocks 58, 60 and the end segment 46 of the lever 42, or, the detent feature 107 can be carried between any one or all of the linkages 62, 64, 66, 68 and the end segment 46.

As best illustrated in FIG. 8, when the lever 42 of the toggle apparatus 48 of the lock device 36 is pulled by the driver, and rearward toward the driver, the over the center or detent feature 107 of the toggle apparatus 48 is first released. With continued pulling of the lever 42 and with the biasing assistance of the springs 108 of the respective indexing apparatuses 54, 56 (see FIG. 6), the device 36 is preferably placed in the unlocked position 38. During this pulling action, the elongated linkages 62, 64, 66, 68 move out of a substantially perpendicular alignment with axis 24 (i.e. move out of the over-the-center orientation and through and out of a perpendicular alignment with axis 24) and out of a parallel relationship with the carrier 50 or direction 52. As the linkages 62, 64, 66, 68 pivot upon the end segment 46 of the lever 42 the linkages 62, 64 shift the lever 42 laterally inward toward and against the inner block 58 and by a first distance 110, and the linkages 66, 68 pull the outer block 60 inward and against the lever end segment 46 by a second distance 112 (see FIG. 7). The sum of the first and second distances 110, 112 is equal to the distance or throw that the carrier 50 moves along direction 52 to disengage the indexing apparatuses 54, 56.

As best illustrated in FIG. 7 when the desired longitudinal position and tilt state of the assembly 20 is selected, the lever 42 of the toggle apparatus 48 of the lock device 36 is pushed by the driver, and forward away from the driver, against the biasing force of the springs 108 of the respective indexing apparatuses 54, 56 and until the over the center feature of the toggle apparatus 48 is reengaged or generally snaps into the locked position 40. During this pushing action, the elongated linkages 62, 64, 66, 68 realign first into a parallel relationship, then into a slightly angled relationship with the carrier 50. As the linkages 62, 64, 66, 68 pivot upon the end segment 46 of the lever 42 the linkages 62, 64 shift the lever 42 laterally outward and away from the inner block 58 by the first distance 110, and the linkages 66, 68 push the outer block 60 outward and away from the lever end segment 46 by a second distance 112.

One skilled in the art would now know that if the assembly 20 generally did not include the tilt indexing apparatus 56, there would be no need for the vertical slots 55, 57 in the bracket 34. Moreover and because the inner block 58 of the toggle apparatus 48 would no longer require a sliding relationship with the bracket 34, there would be no need for the guide feature 63 (see FIGS. 1 and 4) and the block 58 can then be an integral part of the bracket 34. In addition and with proper bushing or guide supports to stabilize motion of the toggle apparatus 48, the linkages 62, 64 may be omitted. Such omission, however, would decrease the distance that the carrier 50 moves over a given lever 42 travel by one half.

Referring to FIG. 13, a second embodiment of a steering column assembly 220 is illustrated wherein like elements to the first embodiment have the same identifying numerals except with the summed addition of two-hundred. Unlike the assembly 20, which is generally manual, assembly 220 has a reversable electric motor 120 with a motor housing supported at least in-part by a steering column housing 226. The motor 120 has a rotating shaft or turn buckle 122 that extends substantially parallel to a rotation axis of a rotating steering shaft. A lever 242 of a toggle apparatus 248 of a push/pull device 236 of the assembly 220 is threaded to the shaft 122 forming a screw and nut mechanism for movement of the lever 242 in a first direction 244 that is generally parallel to the rotation axis.

Figure 14:
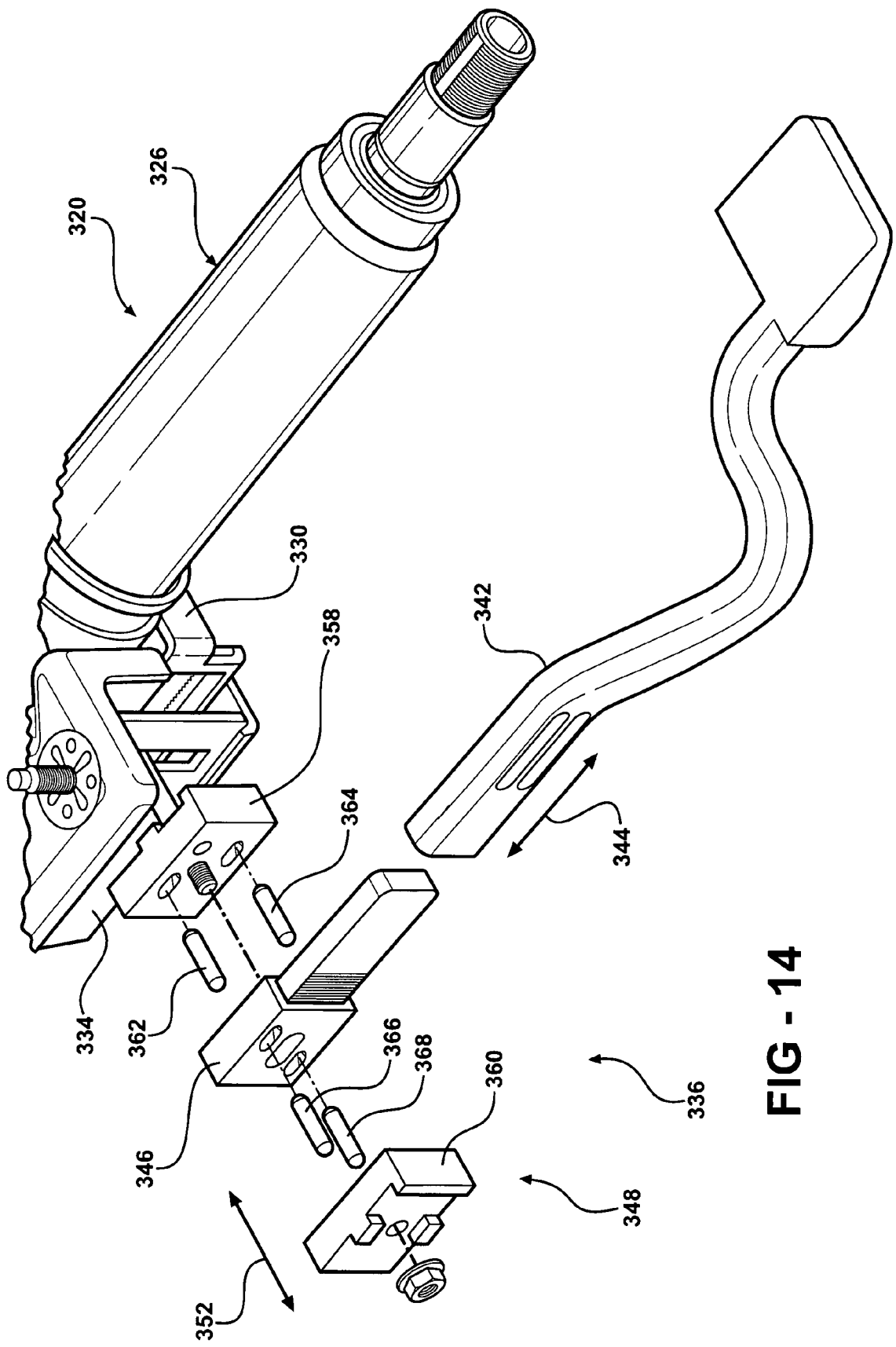
FIG. 14 is an exploded perspective view of a third embodiment of an adjustable steering column assembly.
Figure 15:
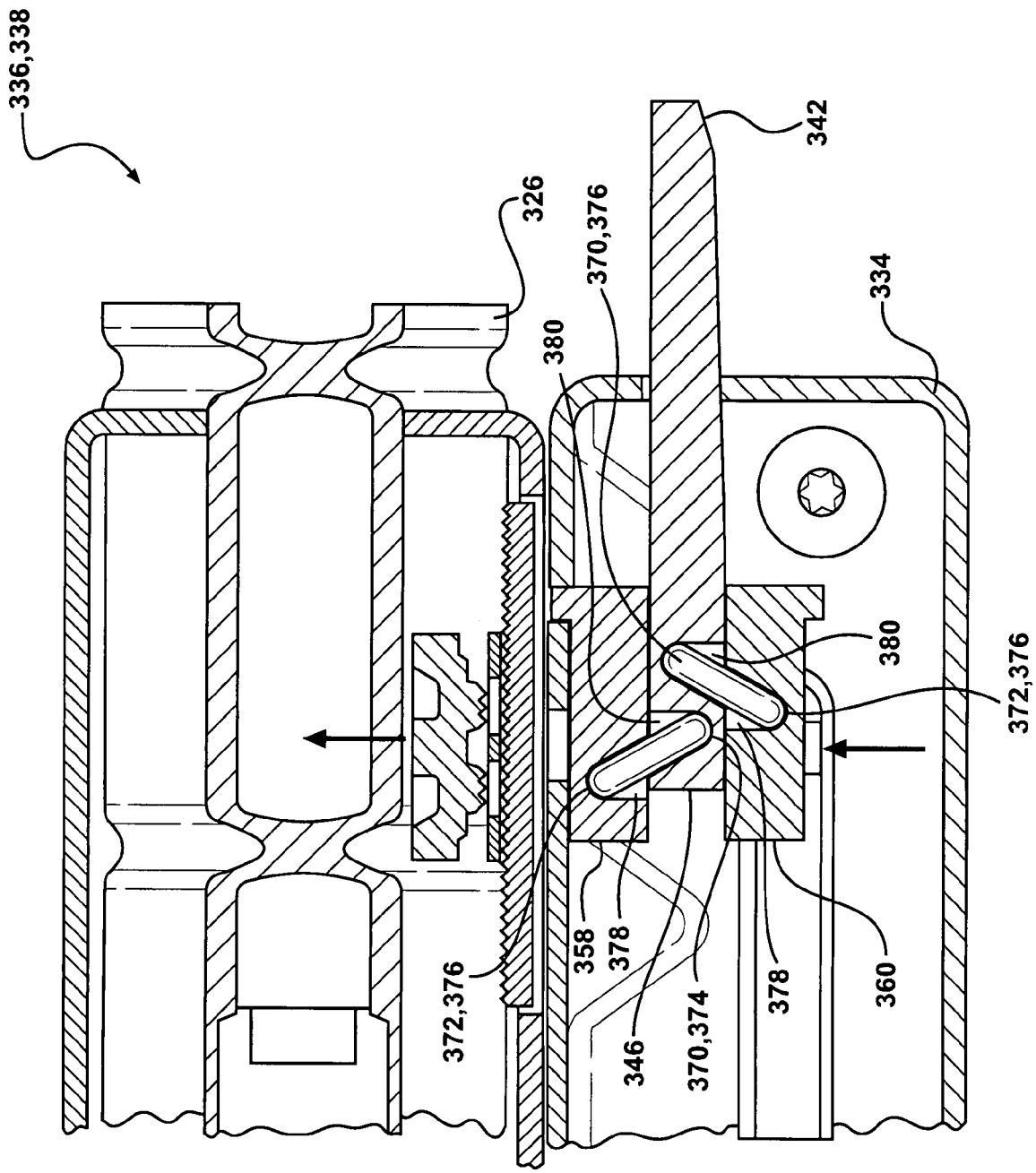
FIG. 15 is a cross section of the third embodiment of the adjustable steering column assembly illustrated in an unlocked position.

Referring to FIGS. 14-16, a third embodiment of a steering column assembly 320 is illustrated wherein like elements to the first embodiment have the same identifying numerals except with the summed addition of three-hundred. A toggle apparatus 348 of a push/pull lock device 336 has an inner member or block 358 that is supported slidably by a bracket 334 and a radially outer member or block 360 that moves in a direction 352 upon movement of a lever 342 along a direction 344. The end segment 346 of lever 342 is preferably located radially between the inner and outer blocks 358, 360 with segment 346 operably engaging the inner block 358 via a pair of inner linkages 362, 364 and operably engaging the outer block 360 via a pair of outer linkages 366, 368. The linkages 362, 364, 366, 368 are elongated dowels each having a first end 370 associated with the end segment 346 of the lever 342 and an opposite second end 372 associated with the respective blocks 358, 360. The toggle apparatus 348 further has four lever-side couplings 374 carried generally between the end segment 346 and the first ends 370 of each respective linkage 362, 364, 366, 368, and four block-side couplings 376 carried generally between the second ends 372 of each respective linkage 362, 364, 366, 368 and the respective blocks 358, 360.

The couplings 374, 376 of the third embodiment do not use the pins 78, 80, 82 of the first embodiment. Instead, the couplings 374, 376 are generally carried by the ends 370, 372 of the dowels 362, 364, 366, 368 and confines of respective diverging cavities 378, 380 of the couplings 374, 376 in the blocks 356, 360 and the end segment 346 of the lever 342. The two cavities 378 in the outer block 360 and the two cavities 378 in the inner block 358 each diverge as the cavities open outward toward end segment 346. The two cavities 380 in end segment 346 diverge as they open outward toward outer block 360 to generally communicate with respective cavities 378, and another two cavities 380 in end segment 346 diverge as they open outward toward inner block 358 to generally communicate with respective cavities 378. With this paired communication of cavities 378, 380, the dowels 362, 364, 366, 368 are generally free to toggle within the respective pairs. The length of the dowels and the depth of the cavities generally dictate the spacing of the blocks 358, 360 from the end segment 346 when the device 336 is in the locked position 340.

Referring to FIGS. 17-18, a fourth embodiment of a steering column assembly 420 is illustrated wherein like elements to the first embodiment have the same identifying numerals except with the summed addition of four-hundred. Unlike the assembly 20 and assembly 320, which are generally manual, assembly 420 has a reversable motor 140 with a motor housing engaged rigidly to a steering column housing (not shown) of the vehicle. The motor 140 has a rotating shaft or turn buckle 142 that extends substantially parallel to an adjustable steering column (not shown). A lever 442 of a push/pull device 436 of the assembly 420 is threaded to the shaft 142 forming a screw and nut mechanism for movement of the lever 442 between an unlocked position 438 and a locked position 440 along a direction 444 that is generally parallel to the column.

While the forms of the invention herein disclosed constitute presently preferred embodiments, many others are possible. It is not intended herein to mention all the possible equivalent forms or ramification of the invention. It is understood that terms used herein are merely descriptive, rather than limiting, and that various changes may be made without departing from the spirit or scope of the invention.

We claim:

1. A releasable lock device for an adjustable steering column assembly of a vehicle having a steering shaft rotatable about an axis and a co-extending housing journaled to the shaft and engaged operably to a bracket, the releasable lock device comprising:
    a first member constructed and arranged for movement in a first direction traverse to the axis;
    a nonpivoting lever having rectilinear movement in a second direction substantially parallel to the axis;
    an elongated first linkage having a first end and an opposite second end;
    a first coupling orientated between said first end and said first member;
    a second coupling orientated between said second end and said lever; and
    wherein movement of said lever in said second direction and from an unlocked position to a locked position moves said linkage toward a perpendicular orientation with respect to the axis.

2. The releasable lock device set forth in claim 1 wherein said first member is located outward from said lever and with respect to the axis.

3. The releasable lock device set forth in claim 2 further comprising:
   a carrier having a first end fixed rigidly to the first member and projecting from the first member and past the lever; and
   an indexing apparatus carried by said carrier for selectable adjustment of the steering column assembly.

4. The releasable lock device set forth in claim 3 further comprising said first indexing apparatus having a spring for exerting a force that biases the lock device toward said unlocked position.

5. A releasable lock device for an adjustable steering column assembly of a vehicle having a steering shaft rotatable about an axis and a co-extending housing journaled to the shaft and engaged operably to a bracket, the releasable lock device comprising:
   a first member constructed and arranged for movement in a first direction traverse to the axis;
   a lever constructed and arranged for movement in a second direction substantially parallel to the axis, said first member located outward from said lever and with respect to the axis;
   an elongated linkage having a first end and an opposite second end;
   a first coupling orientated between said first end and said first member;
   a second coupling orientated between said second end and said lever;
   a carrier having a first end fixed rigidly to the first member and projecting from the first member and past the lever;
   an indexing apparatus carried by said carrier for selectable adjustment of the steering column assembly, said indexing apparatus having a spring for exerting a force that biases the lock device toward said unlocked position; and
   an over the center feature for resiliently snap locking the lock device in said locked position for resisting said biasing force of said spring;
   wherein movement of said lever in said second direction and from an unlocked position to a locked position moves said linkage toward a perpendicular orientation with respect to the axis.

6. A releasable lock device for an adjustable steering column assembly of a vehicle having a steering shaft rotatable about an axis and a co-extending housing journaled to the shaft and engaged operably to a bracket, the releasable lock device comprising:
   a first member constructed and arranged for movement in a first direction traverse to the axis;
   a lever constructed and arranged for movement in a second direction substantially parallel to the axis;
   an elongated first linkage having a first end and an opposite second end;
   a first coupling orientated between said first end and said first member;
   a second coupling orientated between said second end and said lever;
   a second member;
   wherein said lever extends between said first and second members;
   an elongated second linkage having a first end and an opposite second end;
   a third coupling carried between said first end of said second linkage and said second member; and
   a fourth coupling carried between said second end of said second linkage and said lever;
   wherein movement of said lever in said second direction and from an unlocked position to a locked position moves said linkage toward a perpendicular orientation with respect to the axis.

7. The releasable lock device set forth in claim 6 further comprising a third linkage paired with said first linkage, and a fourth linkage paired with said second linkage.

8. The releasable lock device set forth in claim 7 wherein first and third linkages remain in a parallel relationship to one another as the lock device moves between said locked and unlocked positions.

9. The releasable lock device set forth in claim 8 wherein said second and fourth linkages remain in a parallel relationship to one another as the lock device moves between said locked and unlocked positions.

10. The releasable lock device set forth in claim 3 further comprising a cavity in and extending through said lever, and wherein said carrier extends through said cavity from said first member.

11. The releasable lock device set forth in claim 10 wherein said cavity is elongated in said second direction by a distance equal or greater than a throw of said lever along said second direction when moving between said locked and unlocked positions.

12. The releasable lock device set forth in claim 10 wherein said lever is spaced between said first and second members when in said locked position by a total distance equal to said movement of said carrier in said first direction when moving between said locked and unlocked positions.

13. A releasable lock device for an adjustable steering column assembly of a vehicle having a steering shaft rotatable about an axis and a co-extending housing journaled to the shaft and engaged operably to a bracket, the releasable lock device comprising:
   a first member constructed and arranged for movement in a first direction traverse to the axis;
   a lever constructed and arranged for movement in a second direction substantially parallel to the axis;
   an elongated first linkage having a first end and an opposite second end;
   a first coupling orientated between said first end and said first member; and
   a second coupling orientated between said second end and said lever;
   wherein said first and second couplings are pivoting joints each having a pin about which said linkage pivots, and movement of said lever in said second direction and from an unlocked position to a locked position moves said linkage toward a perpendicular orientation with respect to the axis.

14. The releasable lock device set forth in claim 6 further comprising:
   the first, second, third, and fourth couplings being respective first, second third and fourth pivoting joints;
   the first pivoting joint having a first pin engaged to said first member and about which said first end of said first linkage pivots;
   the third pivoting joint having a third pin engaged to said second member and about which said first end of said second linkage pivots; and
   the second and fourth pivoting joints together having at least one pin engaged to said lever and about which said second ends of said first and second linkages respectively pivot.

15. The releasable lock device set forth in claim 6 further comprising:
   said linkage being a dowel;

the first coupling having a first diverging cavity in said first member;

said second coupling having a second diverging cavity in said lever and communicating with said first coupling; and wherein said first end of said dowel is in said first diverging cavity and continuously contacts said first member, and said second end of said dowel is in said second diverging cavity and continuously contacts said lever.

16. An adjustable steering column assembly of a vehicle comprising:

a stationary bracket;

a steering shaft rotatable about an axis;

a housing journaled to and co-extending with said steering shaft and engaged operably to said bracket; and a lock device, said lock device comprising:

a carrier supported slidably by said bracket along at least a first direction and being in selectable contact with said housing;

a toggle apparatus having a nonpivoting push/pull lever extending along a second direction traverse to said first direction, a first member engaged to said carrier and a first linkage having a first end in pivoting contact with said first member and a second end in pivoting contact with said lever; and wherein rectilinear movement of said lever along said second direction causes said linkage to pivot and said carrier to move along said first direction for actuation of said lock device between locked and unlocked positions.

17. The adjustable steering column assembly set forth in claim 16 wherein said second direction is substantially parallel to said axis.

18. The adjustable steering column assembly set forth in claim 16 further comprising an indexing apparatus carried between said carrier and said housing for longitudinal adjustment of said steering column assembly.

19. The adjustable steering column assembly set forth in claim 16 further comprising said toggle apparatus having a second member located between said bracket and said lever and supported by said bracket, and a second linkage having a first end in pivoting contact with said second member and a second end in pivoting contact with said lever.

20. The adjustable steering column assembly set forth in claim 19 further comprising:

a vertical guide feature carried between said bracket and said second member for moving said toggle apparatus vertically during tilt adjustment of the steering column assembly when in said unlocked position; and an indexing apparatus carried between said carrier and said bracket for tilt adjustment of the steering column assembly.

21. The adjustable steering column assembly set forth in claim 20 wherein said guide feature has a projection projecting from said second member and a vertical slot in said bracket for sliding receipt of said projection.

22. The adjustable steering column assembly set forth in claim 20 wherein said carrier extends through said vertical slot from said first member.

23. The adjustable steering column assembly set forth in claim 20 further comprising:

the indexing apparatus being a first indexing apparatus; and a second indexing apparatus carried between said cater and said housing for longitudinal adjustment of the steering column assembly.

24. The adjustable steering column assembly set forth in claim 16 further comprising an electric motor having a threaded rotating shaft geared to said lever for movement of said lever along said second direction.

\* \* \* \* \*